US005443650A

United States Patent [19]

Saska et al.

[11] Patent Number: 5,443,650

[45] Date of Patent: Aug. 22, 1995

[54] PROCESS FOR SOFTENING A SUGAR-CONTAINING AQUESOUS SOLUTION, SUCH AS SUGAR JUICE OR MOLASSES

[75] Inventors: Michael Saska, Baton Rouge, La.; Xaivier Lancrenon, Chicago, Ill.

[73] Assignees: Board of Supervisors of Louisiana State University and Agricultural and Mechanical College, Baton Rouge, La.; Societe Nouvelle de Recherches et D'Applications Industrielles D'Echangeurs D'ions Applexion, Epone, France

[21] Appl. No.: 75,634

[22] Filed: Jun. 11, 1993

[51] Int. Cl.[6] .......................... C13J 1/06; B01J 49/00; B01D 15/00

[52] U.S. Cl. .................................. 127/46.2; 127/46.3; 210/670; 210/678

[58] Field of Search ............................ 127/46.2, 46.3; 210/670, 678

[56] References Cited

U.S. PATENT DOCUMENTS 3,975,205 8/1976 Munir et al. ....................... 127/46.1
4,140,541 2/1979 Popper .............................. 127/46.1

OTHER PUBLICATIONS

Gryllus et al., "Das BMA-Zsigmond-Gryllus-Verfahren—ein neues Verfahren zur Dünnsaftenkaltung," Z. Zuckerind. vol. 25, No. 9, pp. 493–500 (1975) 20 Sep.

Shore et al., "Ion Exchange Processes in Beet Manufacture," pp. 59–61 of pp. 46–95 in Clarke et al., Chemistry and Processing of Sugarbeet and Sugarcane, Sugar Series, 9 (1988) No month available.

Henaff et al., "Nouveau procédé de décalcification des jus sucrés san régénérant chimique ni eaux résiduaires," Industries Aimentaires et Agricoles, pp. 725–729 (1977) No month available.

Gryllus et al., "Das BMA-Zsigmond-Gryllus-Verfahren—ein neues Verfahren zur Dünnsaftenkaltung," Z. Zuckerind. vol. 25, No. 9, pp. 493–500 (1975) No month available.

Zsigmond et al., "Recent Experience on the Application of Ion Exchangers in Some Branches of Food Industry I & II," Zucker, Nos. 23 & 24, pp. 621–630, 655–661 (1966) No month available.

*Primary Examiner*—Paul Lieberman
*Assistant Examiner*—Patricia Hailey
*Attorney, Agent, or Firm*—John H. Runnels

[57] ABSTRACT

The invention relates to a process for softening an aqueous sugar juice containing sugars and $Ca^{2+}$ and/or $Mg^{2+}$ ions, such as a sugar factory molasses by means of a cation exchange resin, in the form of $Na^{+}$ and/or $K^{+}$, and for regeneration of said resin, comprising:

(a) a softening step wherein the said sugar juice is brought into contact with the said cation exchange resin, in the form $Na^{+}$ and/or $K^{+}$, to give, on the one hand, a softened sugar juice depleted in $Ca^{2+}$ and/or $Mg^{2+}$ ions and charged with $Na^{+}$ and/or $K^{+}$ ions and, on the other hand, a cation exchange resin charged with $Ca^{2+}$ and/or $Mg^{2+}$ ions, and (b) a step for the regeneration of said latter resin, characterised in that the regeneration step (b) comprises bringing the said resin into contact with a liquid effluent produced on separation by chromatography of the sugars from a softened aqueous sugar juice containing sugars and $Na^{+}$ and/or $K^{+}$ ions, said liquid effluent containing the majority of the $Na^{+}$ and/or $K^{+}$ ions initially present in the softened sugar juice.

7 Claims, 1 Drawing Sheet

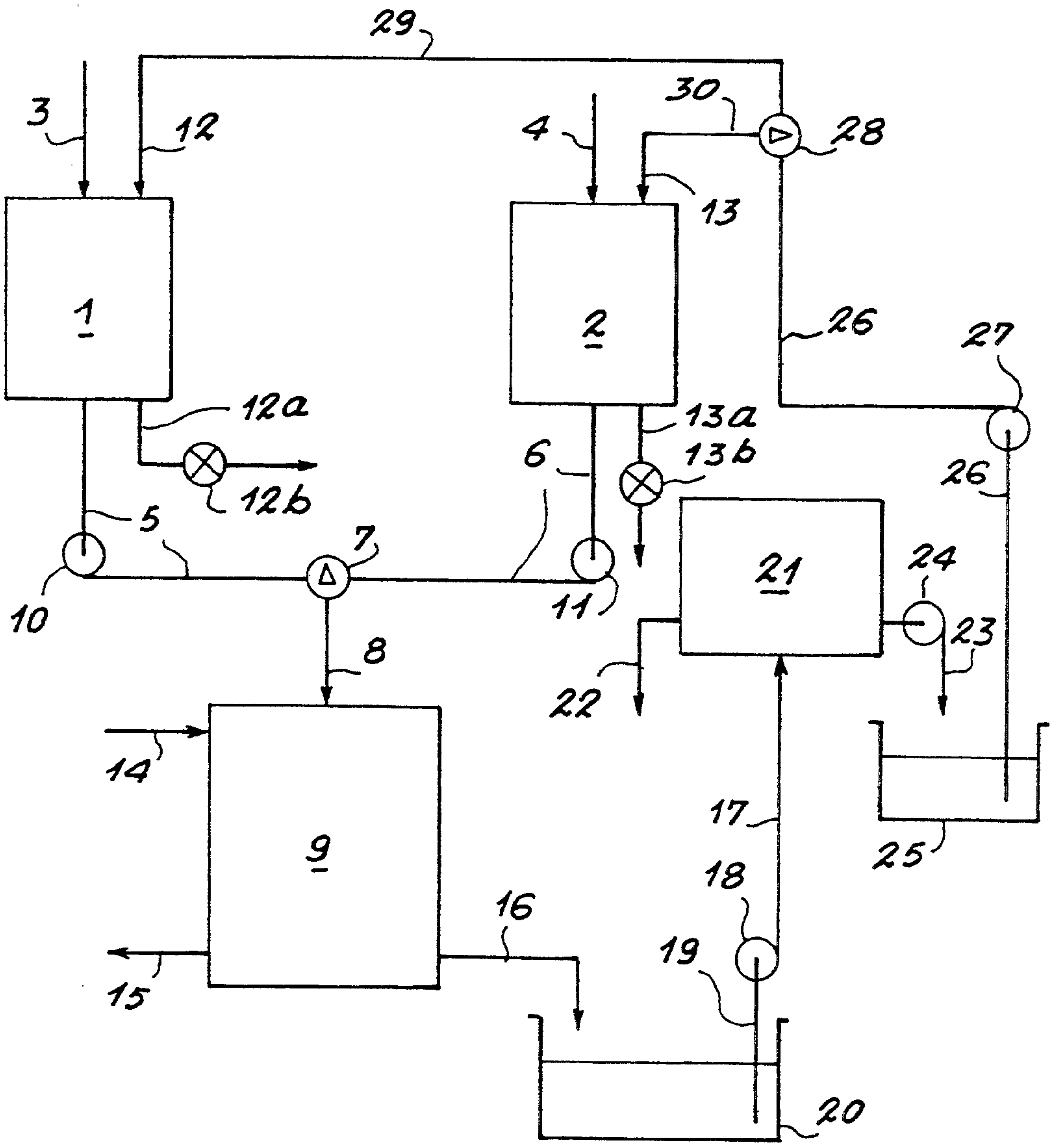
29
30
3
12
4
28
13
1
2
26
27
12a
13a
12b
6
13b
26
5
7
21
24
10
11
23
8
22
14
9
17
25
18
16
19
15
20

PROCESS FOR SOFTENING A SUGAR-CONTAINING AQUEOUS SOLUTION, SUCH AS SUGAR JUICE OR MOLASSES

This invention relates to a process for softening a sugar juice such as a sugar factory molasses, and its use in a process for recovery of the sugars contained in said sugar juice.

The sugar cane or sugar beet sugar industry produces appreciable quantities of non-crystallisable sugar juice known as sugar factory molasses. This molasses has an appreciable sugar content so that it is conventional to subject it to suitable treatment for extracting most of the sugars it contains. This treatment consists, inter alia, in subjecting the molasses to an ion exclusion chromatography using a fixed support comprising a strong cation resin in the $Na^+$ and/or $K^+$ form. However, since sugar factory molasses contains appreciable quantities of dissolved magnesium and/or calcium salts, the said resin becomes charged in $Ca^{2+}$ and/or $Mg^{2+}$ ions during the chromatography operation so that its separating power drops off relatively rapidly. This necessitates periodic interruption of the chromatography operation to regenerate the cation resin, and this involves consumption of a regeneration reagent and a reduction in productivity.

It has therefore been proposed that the calcium and/or magnesium salts dissolved in the molasses should be eliminated, by ion exchange on a cation resin in the $Na^+$ and/or $K^+$ form, before the molasses is subjected to chromatography. Since, during this ion exchange, the $Na^+$ and/or $K^+$ ions of the cation resin are progressively replaced by the $Ca^{2+}$ and/or $Mg^{2+}$ ions of the molasses, the said resin must be periodically regenerated, this conventionally being effected by means of an aqueous solution of NaCl. This regeneration technique essentially has two disadvantages: it necessitates the consumption of a regeneration reagent (NaCl) and it produces waste water containing lost sugar. This regeneration system using an aqueous solution of NaCl is therefore unsatisfactory economically.

The object of this invention therefore is to propose a softening process without the above disadvantages. The invention therefore proposes a process for softening an aqueous sugar juice containing sugars and $Ca^{2+}$ and/or $Mg^{2+}$ ions, such as a sugar factory molasses, by means of a cation exchange resin, and for regeneration of said resin, comprising:

(a) a softening step wherein the said sugar juice is brought into contact with the said cation exchange resin, in the form $Na^+$ and/or $K^+$, to give, on the one hand, a softened sugar juice depleted in $Ca^{2+}$ and/or $Mg^{2+}$ ions and charged with $Na^+$ and/or $K^+$ ions and, on the other hand, a cation exchange resin charged with $Ca^{2+}$ and/or $Mg^{2+}$ ions, and (b) a step for the regeneration of said latter resin, characterised in that the regeneration step (b) comprises bringing the said resin into contact with a liquid effluent (the raffinate) produced on separation by chromatography of the sugars from a softened aqueous sugar juice containing sugars and $Na^+$ and/or $K^+$ ions, said liquid effluent containing the majority of the $Na^+$ and/or $K^+$ ions initially present in the softened sugar juice.

It will readily be seen that the regeneration step of the process according to the invention makes clever use of one of the liquid effluents available in a sugar factory, i.e. the raffinate generated during the chromatography separation of the sugars from a softened sugar juice and charged with $Na^+$ and/or $K^+$ ions, said fraction usually being simply discarded from the factory. Consequently there is no supply of external regeneration reagent and hence there is a saving compared with the prior art regeneration system. Also, the sugar losses are reduced compared with the known system.

The liquid effluent (raffinate) used in step (b) is advantageously the effluent produced on chromatography separation of the sugars from the softened sugar juice obtained in step (a).

According to the invention, it is also advantageous to concentrate the liquid effluent (raffinate) before its use in step (b), since the degree of regeneration is all the higher the higher the concentration of said effluent in $Na^+$ and/or $K^+$ ions. According to the invention, it is also advantageous for $Na^+$ and/or $K^+$ ions to be added to the effluent before the said resin is brought into contact with said liquid effluent in step (b), and this further improves regeneration.

It should be added that the cation exchange resin used in step (a) will preferably be a strong cation resin in the form $Na^+$ and/or $K^+$ and that the chromatography producing the liquid effluent (raffinate) used in step (b) is preferably carried out on a strong cation resin in the form $Na^+$ and/or $K^+$ with elution by water. The strong cation resin selected may, inter alia, be any resin comprising a polymeric matrix, e.g. of the polystyrene or polyacrylate type, cross-linked by a cross-linking agent such as divinyl benzene, cation exchanger groups being grafted on said matrix, e.g. strongly acid sulphonic acid groups. A particular preference is the resin IR 200 (trade mark of a resin marketed by Rohm and Haas).

The invention also relates to the softened sugar juice obtained by the above-described softening process.

It also relates to a process for the recovery of the sugars contained in an aqueous sugar juice containing essentially sugars, $Ca^{2+}$ and/or $Mg^{2+}$ ions, and colouring agents, such as a sugar factory molasses, comprising:

(i) a softening step wherein the said sugar juice is brought into contact with a cation exchange resin, in the form $Na^+$ and/or $K^+$, to give, on the one hand, a softened sugar juice depleted in $Ca^{2+}$ and/or $Mg^{2+}$ ions and charged with $Na^+$ and/or $K^+$ ions and, on the other hand, a cation exchange resin charged with $Ca^{2+}$ and/or $Mg^{2+}$ ions, and (ii) a sugar separation step comprising submitting the softened sugar juice obtained in step (i) to chromatography to obtain a first liquid effluent (raffinate) enriched in $Na^+$ and/or $K^+$ ions and depleted in sugars, and a second liquid effluent enriched in sugars and depleted in $Na^+$ and/or $K^+$ ions, characterised in that it also comprises:

(iii) a regeneration step comprising bringing the cation exchange resin charged with $Ca^{2+}$ and/or $Mg^{2+}$ ions obtained in step (i) into contact with the said first liquid effluent (raffinate) produced in step (ii) to give, on the one hand, a liquid effluent enriched in $Ca^{2+}$ and/or $Mg^{2+}$ ions and, on the other hand, a regenerated cation exchange resin in the form $Na^+$ and/or $K^+$.

It should be noted that the said first liquid effluent (raffinate) is preferably concentrated before being used in step (iii), that the $Na^+$ and/or $K^+$ ions may be added to the first liquid effluent before the use thereof in step (iii), that the cation exchange resin used in step (i) is preferably a strong cation resin in the $Na^+$ and/or $K^+$ form, and that the chromatography used in step (ii) is preferably carried out on a strong cation resin in the $Na^+$ and/or $K^+$ form with elution with water. The strong cation resin used may be those already mentioned hereinbefore in connection with the softening process.

The invention also relates to the liquid effluent enriched in sugars as obtained by the above-described recovery process.

Finally, the invention relates to apparatus for performing the process for the regeneration of sugars as described above, comprising:

at least one softening unit containing a cation exchange resin in the form $Na^+$ and/or $K^+$ and comprising means for supplying aqueous sugar juice for softening, means for supplying regeneration liquid, means for extraction of the softened aqueous sugar juice and means for extraction of spent regeneration liquid, and at least one chromatography unit comprising means for supplying eluent, means for supplying softened aqueous sugar juice produced in the softening unit and means for extracting a liquid effluent enriched in $Na^+$ and/or $K^+$ ions and depleted in sugars (raffinate), characterised in that it also comprises connecting means for connecting the said regeneration liquid supply means to the chromatography unit extraction means, it being noted that the said connecting means may, if required, comprise a concentration unit for the said liquid effluent (raffinate) extracted by said extraction means.

Other objects and advantages of the invention will be apparent from the following description with reference to the accompanying drawing, the single FIGURE of which is a diagram showing the principle of one embodiment of apparatus for the recovery of the sugars from a sugar factory molasses.

The apparatus shown by way of example in this Figure comprises in manner known per se two softening units 1, 2 each comprising a column filled with a strong cation resin in the $Na^+$ and/or $K^+$ form, e.g. the resin IR® 200 marketed by Rohm & Haas. These columns are each provided at the top with a conduit 3, 4 for supplying sugar factory molasses (aqueous sugar juice) previously clarified and diluted by deionised water. Clarification can be effected by any known method, e.g. by use of the clarification process described in U.S. Pat. No. 5,110,363. With regard to dilution, this is so carried out that the dry substance content of the molasses after dilution is preferably of the order of 10 to 70% by weight. The molasses thus clarified and diluted essentially comprises sugars, mineral salts of sodium, potassium, calcium and, possibly, magnesium and colouring agents.

Each softening column 1, 2 is also provided at the bottom with a conduit 5, 6 for the discharge of softened molasses, the conduits 5, 6 both leading to a three-way valve 7, from which extends a conduit 8, the free end of which leads to the top of a chromatography column 9. If necessary, a circulating pump 10, 11 can be provided in each conduit 5, 6. Finally, the top of each column 1, 2 is provided with a resin regeneration liquid supply conduit 12, 13 and the bottom is provided with a spent regeneration liquid outlet conduit 12*a*, 13*a*, each having an isolating valve 12*b*, 13*b*.

The chromatography column 9 is of the type comprising a fixed support comprising a strong cation resin, in the $Na^+$ and/or $K^+$ form, the elution liquid being water supplied to the top of the column via a conduit 14. The bottom of the column 9 has a conduit 15 for extraction of a liquid effluent (raffinate) rich in sugars, and a conduit 16 for extraction of a sugar-depleted liquid effluent.

According to the invention, the apparatus described above also comprises means for supplying raffinate (regeneration liquid) from the extraction conduit 16 to the conduits 12, 13. These means comprise:

(a) a pipe 17, one of the ends of which is connected to the delivery of a circulating pump 18, the intake of which is connected to a conduit 19, the free end of which extends to close to the bottom of a tank 20 into which the free end of the extraction conduit 16 leads;

(b) a concentration unit 21 provided with an inlet for liquid for concentration, connected to the pipe 17, an outlet 22 for water separated during the concentration, and an outlet 23 for concentrated liquid, this outlet being provided with an extraction pump 24;

(c) a tank 25 into which the outlet 23 leads; and (d) a pipe 26 containing a circulating pump 27, one of the ends of said pipe being situated close to the bottom of the tank 25 and the other end leading to a three-way valve 28 from which extend a conduit 29 connected to conduit 12 and a conduit 30 connected to conduit 13.

The concentration unit may be in the form of an evaporator operating under reduced pressure. It may be a single or multi-effect falling float evaporator well known in the art in question. In that case the outlet 22 discharges the condensates formed during evaporation.

This apparatus operates as follows:

During a first cycle, the valve 7 is positioned to bring the conduit 8 into communication with the conduits 5 and 6, the pumps 10, 11, 18 and 24 are operating, pump 27 is inoperative and valves 12*b*, 13*b* and 28 are closed.

The clarified and diluted molasses (10 to 70% in respect of dry substance weight) is supplied via conduits 3 and 4 to columns 1 and 2 where it undergoes cation exchange, the $Na^+$ and/or $K^+$ ions of the resin disposed in these columns being progressively replaced by the $Ca^{2+}$ and/or $Mg^{2+}$ ions present in the molasses. As a result, the molasses is enriched in $Na^+$ and/or $K^+$ ions and depleted in $Ca^{2+}$ and/or $Mg^{2+}$ ions, while the resin is enriched in $Ca^{2+}$ and/or $Mg^{2+}$ ions and depleted in $Na^+$ and/or $K^+$ ions.

The molasses from the columns 1, 2 is then fed via the conduits 5, 6, pumps 10, 11, valve 7 and conduit 8 to the chromatography column 9. Here the molasses is subjected to separation under the effect of the resin and the water supplied by the conduit 14 as eluent.

The first eluted fractions (constituting the raffinate) which are depleted in sugars and rich in salts of sodium and/or potassium and colouring agents, are extracted by the conduit 16 and poured into the tank 20. The next fractions, which are depleted in sodium and/or potassium salts and rich in sugars, are extracted via the conduit 15.

At the same time, or subsequently, the recovered raffinate in the tank 20 is fed via conduit 19, pump 18 and pipe 17 to the evaporation unit 21. The concentrated raffinate (preferably 10 to 70% by weight of dry substance) produced in said unit 21 is extracted therefrom via conduit 23 and pump 24 and poured into the tank 25.

During a second cycle, the ion exchange resin of one of the columns 1 and 2 is regenerated, e.g. the resin of column 1. For this purpose, the supply of molasses for softening is stopped, pump 10 is switched off, valve 7 is set to bring conduit 8 into communication solely with conduit 6, valve 12b is open, valve 28 is positioned to connect conduit 26 only to conduit 29 and pump 27 is switched on.

Under these conditions, the concentrated raffinate from tank 25 is fed via conduits 26, 29 and 12 to column 1, where the concentrated raffinate rich in $Na^+$ and/or $K^+$ ions will pass through the resin contained in column 1 and regenerate it, the $Na^+$ and/or $K^+$ ions of the said concentrated raffinate progressively replacing the $Ca^{2+}$ and/or $Mg^{2+}$ ions of the resin. The concentrated raffinate which, during its passage through the resin, is enriched in $Ca^{2+}$ and/or $Mg^{2+}$ ions is then discharged via conduit 12*a*.

Once regeneration is completed, a third cycle is carried out for regeneration of the resin of column 2, the softening operations being resumed in column 1. This involves shutting down the supply of molasses to the column 2, opening valve 13*b*, connecting conduit 26 to conduit 30 by adjusting the setting of valve 28, connecting conduit 8 to conduit 5 by adjusting the position of valve 7 and resuming the supply of molasses to column 1.

The second and third cycles are then repeated at uniform intervals.

By way of information, it should-be noted that during the softening operation the flow of clarified and diluted molasses (10 to 70% by weight of dry substance) through each column 1, 2 may be of the order of 0.1 to 5 times the volume of the resin bed per hour and that during the regeneration operation the rate of flow of regeneration liquid (concentrated raffinate present in tank 25 and containing 10 to 70% by weight of dry substance) through each column 1, 2 may be of the order of 0.1 to 5 times the volume of the resin bed per hour.

These rates of flow are selected in dependence on the dry substance content of the liquid used. Thus the higher the dry substance content of the molasses the lower the rate of flow of molasses through the columns 1, 2 for the softening operation. Similarly, the higher the dry substance content of the regeneration liquid (concentrated raffinate), the lower the rate of flow of said liquid through the columns 1, 2.

Also, the temperature of the regeneration liquid will be adjusted to give a liquid of appropriate viscosity for the regeneration operations; the temperature may be within the range of 20° to 70° C. depending on the dry substance content.

It should also be noted that, if required, $Na^+$ and/or $K^+$ ions (in the form of NaCl and/or KCl for example) may be added to the concentrated raffinate, e.g. at tank 25.

It should also be noted that all or some of the NaCl and/or KCl thus added may, if required, be recovered by recrystallisation of the concentrated raffinate which was used for the regeneration and obtained from conduit 12*a* and/or 13*a*.

EXAMPLE OF PERFORMANCE OF THE INVENTION

1. Softening Operation molasses for softening: 15% by weight of dry substance; hardness 12 000 ppm expressed in $Ca^{2+}$ ions in relation to the dry substance;

softening resin: resin IR® 200 of Rohm and Haas (exchange capacity of 1 equivalent/liter);

temperature: 40° to 80° C.;

rate of flow of molasses: twice the volume of the softening resin bed per hour; there is saturation of the resin after two-and-a-half hours of molasses flow;

softened molasses: having a mean hardness of 2,000 ppm expressed as $Ca^{2+}$ ions with respect to dry substance.

2. Chromatography Operation chromatography resin: Dowex ® C 356 of the DOW Company temperature: of the order of 80° C.

rate of flow of softened molasses: of the order of 0.03 times the volume of the chromatography resin bed per hour rate of flow of elution water: 16 times the volume of the chromatography resin bed per hour raffinate: dry substance content: ≅4% by weight

3. Raffinate Concentration Operation concentration unit: falling float evaporator (evaporation temperature ≅80° C.)

dry substance content after concentration: 30% by weight of dry substance

4. Regeneration temperature: 25° C.

concentrated raffinate rate of flow: 0.45 times the volume of softening resin per hour; regeneration is complete after passage of a concentrated raffinate volume corresponding to 0.34 times the volume of the resin rate of flow.

5. Water Rinsing of the Softening Resin rate of flow of water: twice the volume of the resin bed per hour;

duration: 1 hour.

We claim:

1. A process comprising the steps of:

(a) contacting an aqueous solution of sugar and calcium or magnesium divalent cations with an ion-exchange resin comprising sodium or potassium monovalent cations, until the concentration of sodium or potassium cations in said aqueous solution has been enriched in comparison to the initial concentration of sodium or potassium cations in said aqueous solution, and the concentration of calcium or magnesium cations in said aqueous solution has been depleted in comparison to the initial concentration of calcium or magnesium cations in said aqueous solution;

(b) separating the sodium-or-potassium-cation-enriched solution into two fractions: a first fraction comprising a major portion of the sugar from the sodium-or-potassium-cation-enriched solution, and a second, raffinate fraction comprising an aqueous effluent containing concentrated sodium or potassium cations from the sodium-or-potassium-cation-enriched solution; and (c) regenerating the ion-exchange resin by contacting the resin with the effluent until a major portion of the calcium or magnesium cations in the resin have been replaced by potassium or sodium cations.

2. A process as recited in claim 1, wherein the aqueous solution comprises sugar juice.

3. A process as recited in claim 1, wherein the aqueous solution comprises molasses.

4. A process as recited in claim 1, wherein the effluent is concentrated prior to regenerating the ion-exchange resin.

5. A process as recited in claim 1, wherein sodium or potassium monovalent cations are added to the effluent prior to regenerating the ion-exchange resin.

6. A process as recited in claim 1, wherein the ion-exchange resin comprises a strong acid cation exchange resin in sodium or potassium form; and wherein said separating step is performed with a strong acid cation exchange resin in sodium or potassium form, and with elution with water.

7. A process as recited in claim 1, wherein said separating step comprises a chromatographic separation.

* * * * *

US005443650B1

REEXAMINATION CERTIFICATE (3522th)

United States Patent [19]

Saska et al.

[11] B1 5,443,650

[45] Certificate Issued May 26, 1998

[54] PROCESS FOR SOFTENING A SUGAR-CONTAINING SOLUTION, SUCH AS SUGAR JUICE OR MOLASSES

[75] Inventors: Michael Saska, Baton Rouge, La.; Xaivier Lancrenon, Chicago, Ill.

[73] Assignees: Board of Supervisors of Louisiana State University and Agricultural and Mechanical College, Baton Rouge, La.; Societe Nouvelle de Recherches et d'Applications Industrielles d'Echangeurs D'Ions Applexion, Epone, France

Reexamination Request:
No. 90/004,485, Dec. 13, 1996

Reexamination Certificate for:

| | |
|---|---|
| Patent No.: | **5,443,650** |
| Issued: | **Aug. 22, 1995** |
| Appl. No.: | **75,634** |
| Filed: | **Jun. 11, 1993** |

[51] Int. Cl.[6] .............................. C13J 1/06; B01J 49/00; B01D 15/00

[52] U.S. Cl. ........................ 127/4.62; 127/46.3; 210/670; 210/678

[58] Field of Search ................................ 127/46.2, 46.3; 210/670, 678

[56] References Cited

PUBLICATIONS

Schoenrock, K., "Ion Exchangers in the Sweetener Industry," Chapter 2.10 from *Ion Exchangers*, Editor Konrad Dorfner, 1991.

Schoenrock, "The Development and Application of Continuous Ion Exclusion.", C.I.T.S. Meeting Articles, Feb. 1987, pp. 383–394.

Norman et al., "Ion Exclusion Purification of Sugar Juices." *Journal of the American Society of Sugar Beet Technologists*, vol. 12, No. 5, Apr. 1963, pp. 363–370.

Gross, "Purification of sugar Products by the Ion Exclusion Process", *International Sugar Journal*, Oct. 1971, pp. 298–301.

*Primary Examiner*—M. L. Bell

[57] ABSTRACT

The invention relates to a process for softening an aqueous sugar juice containing sugars and $Ca^{2+}$ and/or $Mg^{2+}$ ions, such as a sugar factory molasses by means of a cation exchange resin, in the form of $Na^+$ and/or $K^+$, and for regeneration of said resin, comprising:

(a) a softening step wherein the said sugar juice is brought into contact with the said cation exchange resin, in the form $Na^+$ and/or $K^+$, to give, on the one hand, a softened sugar juice depleted in $Ca^{2+}$ and/or $Mg^{2+}$ ions and charged with $Na^+$ and/or $K^+$ ions and, on the other hand, a cation exchange resin charged with $Ca^{2+}$ and/or $Mg^{2+}$ ions, and (b) a step for the regeneration of said latter resin, characterised in that the regeneration step (b) comprises bringing the said resin into contact with a liquid effuent produced on separation by chromatography of the sugars from a softened aqueous sugar juice containing sugars and $Na^+$ and/or $K^+$ ions, said liquid effluent containing the majority of the $Na^+$ and/or $K^+$ ions initially present in the softened sugar juice.

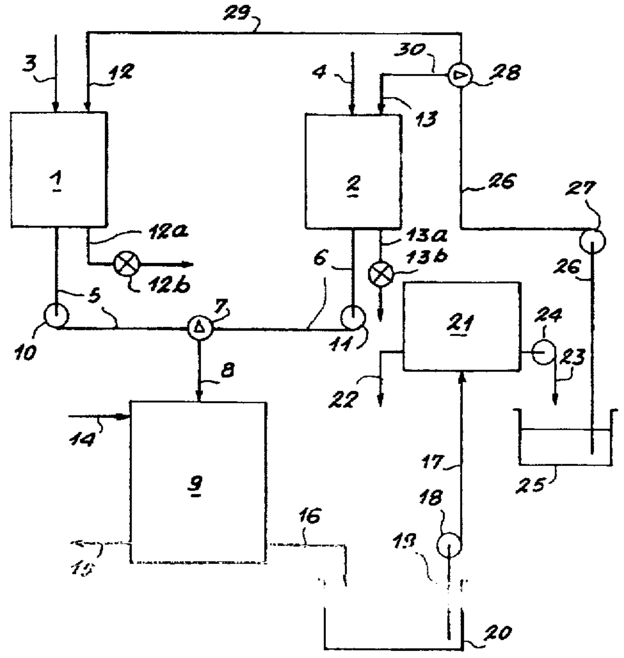

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–7, dependent on an amended claim, are determined to be patentable.

New claims 8 and 9 are added and determined to be patentable.

1. A process comprising the steps of:

(a) contacting an aqueous solution of sugar and calcium or magnesium divalent cations with [an ion-exchange] *a strong cation exchange* resin comprising sodium or potassium monovalent cations, until the concentration of sodium or potassium cations in said aqueous solution has been enriched in comparison to the initial concentration of sodium or potassium cations in said aqueous solution, and the concentration of calcium or magnesium cations in said aqueous solution has been depleted in comparison to the initial concentration of calcium or magnesium cations in said aqueous solution, *but wherein said aqueous solution is not free of calcium or magnesium cations*;

(b) separating the sodium-or-potassium-cation-enriched solution into two fractions: a first fraction comprising a major portion of the sugar from the sodium-or-potassium-cation-enriched solution, and a second, raffinate fraction comprising an aqueous effluent containing concentrated sodium or potassium cations from the sodium-or-potassium-cation-enriched solution, *wherein said effluent is not free of calcium or magnesium cations*; and (c) regenerating the [ion-exchange] *strong cation exchange* resin by contacting the resin with the effluent until a major portion of the calcium or magnesium cations in the resin [have] *has* been replaced by potassium or sodium cations.

*8. A process as recited in claim 1, wherein the concentration of calcium or magnesium cations in said aqueous solution after said contacting step is at least about 2,000 parts per million, expressed as $Ca^{2+}$ ions with respect to dry substance.*

*9. A process as recited in claim 1, wherein the concentration of calcium or magnesium cations in said aqueous solution after said contacting step is about 2,000 parts per million, expressed as $Ca^{2+}$ ions with respect to dry substance.*

* * * * *

US005443650B2

REEXAMINATION CERTIFICATE (4096th)

United States Patent [19]

[11] B2 5,443,650

Saska et al.

[45] Certificate Issued May 30, 2000

[54] PROCESS FOR SOFTENING A SUGAR-CONTAINING AQUEOUS SOLUTION, SUCH AS SUGAR JUICE OR MOLASSES

[75] Inventors: Michael Saska, Baton Rouge, La.; Xaivier Lancrenon, Chicago, Ill.

[73] Assignees: Board of Supervisors of Louisiana State University and Agricultural and Mechanical College, Baton Rouge, La.; Societe Nouvelle de Recherches et d'Applications Industrielles d'Echangeurs d'Ions Applexion, Epone, France

Reexamination Request:
No. 90/005,337, Apr. 22, 1999

Reexamination Certificate for:

| | |
|---|---|
| Patent No.: | **5,443,650** |
| Issued: | **Aug. 22, 1995** |
| Appl. No.: | **08/075,634** |
| Filed: | **Jun. 11, 1993** |

Reexamination Certificate B1 5,443,650 issued May 26, 1998

[51] Int. Cl.[7] .............................. C13J 1/06; B01J 49/00; B01D 15/00

[52] U.S. Cl. ........................ 127/46.2; 127/46.3; 210/670; 210/678

[58] Field of Search ................................ 127/46.2, 46.3; 210/670, 678

[56] References Cited

PUBLICATIONS

Erik Ekern, "Thin Juice Softening Using the Gryllus Process" presented to the Twenty–sixth General Meeting of the American Society of Sugar Beet Technologies, Feb. 24–27, 1991.

H.G. Schneider et al., The Recovery of Sugar from Beet Molasses by the Pfeifer Und Langen Exclusion Process:, American Society of Sugar Beet Technologists, Feb. 24–28, 1974.

X. Lancrenon et al., "Process for Deliming Sugar Juices", International Sugar Journal, 1984, vol. 86, No. 1022 (Month Not Available).

Gross, "Purification of Sugar Products by the Ion Exclusion Process", International Sugar Journal, Oct. 1971, pp. 298–301.

James F. Zievers et al., "The Recovery of Sugar From Beet Molasses by Ion Exclusion" S.I.T. Paper No. 373, 1974. (Month Not Available).

Konrad Dorfner, "Ion Exchangers", 1991, (more particularly, Chapter 2, 10 entitled "Ion Exchangers in the Sweetener Industry" by Karlheinz W.R.Schoenrock. (Month N/A).

Schoenrock, K., "Ion Exchangers in the Sweetener Industry," Chapter 2.10 from Ion Exchangers, Editor Konrad Dorfner (1991) Month Not Available.

*Primary Examiner*—M. L. Bell

[57] ABSTRACT

The invention relates to a process for softening an aqueous sugar juice containing sugars and $Ca^{2+}$ and/or $Mg^{2+}$ ions, such as a sugar factory molasses by means of a cation exchange resin, in the form of $Na^+$ and/or $K^+$, and for regeneration of said resin, comprising:

(a) a softening step wherein the said sugar juice is brought into contact with the said cation exchange resin, in the form $Na^+$ and/or $K^+$, to give, on the one hand, a softened sugar juice depleted in $Ca^{2+}$ and/or $Mg^{2+}$ ions and charged with $Na^+$ and/or $K^+$ ions and, on the other hand, a cation exchange resin charged with $Ca^{2+}$ and/or $Mg^{2+}$ ions, and (b) a step for the regeneration of said latter resin, characterised in that the regeneration step (b) comprises bringing the said resin into contact with a liquid effluent produced on separation by chromatography of the sugars from a softened aqueous sugar juice containing sugars and $Na^+$ and/or $K^+$ ions, said liquid effluent containing the majority of the $Na^+$ and/or $K^+$ ions initially present in the softened sugar juice.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 is confirmed.

New claim 10 is added and determined to be patentable.

*10. A process as recited in claim 1, wherein said separating step comprises separating the first and second fractions by ion exclusion chromatography.*

* * * * *